United States Patent
Egerbrecht et al.

(12) 
(10) Patent No.: US 6,228,950 B1
(45) Date of Patent: May 8, 2001

(54) POLYMER DISPERSANTS AND METHODS OF USE IN A NUCLEAR STEAM GENERATOR

(75) Inventors: Phillip M. Egerbrecht, West Chicago; Joseph D. Bates, Joliet; John A. Kelly, Crystal Lake; James D. Haff, Lake Zurich; Ralph Minnis, Des Plaines, all of IL (US)

(73) Assignees: Commonwealth Edison Company, Chicago, IL (US); Betz Dearborn Inc., Trevose, PA (US)

( * ) Notice: Subject to any disclaimer, the term of this patent is extended or adjusted under 35 U.S.C. 154(b) by 0 days.

(21) Appl. No.: 09/206,334

(22) Filed: Dec. 8, 1998

Related U.S. Application Data

(62) Division of application No. 08/677,464, filed on Jul. 10, 1996, now Pat. No. 5,864,596.

(51) Int. Cl.[7] .................................................. C08F 8/32
(52) U.S. Cl. ............................. 525/329.4; 525/329.9; 525/330.5; 525/379; 525/380; 525/382
(58) Field of Search ........................... 525/329.9, 329.4, 525/330.5

(56) References Cited

U.S. PATENT DOCUMENTS

| | | |
|---|---|---|
| 3,890,228 | 6/1975 | Haw et al. . |
| 4,457,847 | 7/1984 | Lorenc et al. . |
| 4,764,337 | 8/1988 | Panson . |
| 4,814,389 * | 3/1989 | Garvey et al. ............... 525/329.9 |
| 4,828,713 | 5/1989 | McDonald et al. . |
| 4,877,535 | 10/1989 | Kobayashi et al. . |
| 4,895,696 | 1/1990 | Bellows . |
| 4,931,206 | 6/1990 | McDonald et al. . |
| 4,952,324 | 8/1990 | McDonald et al. . |
| 5,024,783 | 6/1991 | Busch et al. . |
| 5,108,619 | 4/1992 | McDonald et al. . |
| 5,122,278 | 6/1992 | Longworth et al. . |
| 5,124,047 | 6/1992 | Quach et al. . |
| 5,180,498 | 1/1993 | Chen et al. . |
| 5,242,599 | 9/1993 | Chen et al. . |
| 5,527,468 | 6/1996 | Boyette et al. . |

FOREIGN PATENT DOCUMENTS

| | | |
|---|---|---|
| 1133787 | 10/1982 | (CA) . |
| 0018083 | 10/1980 | (EP) . |

OTHER PUBLICATIONS

Chem. Eng. Pheland et all, Mar. 3, 1975, vol. 82, pp.82, pp.174, 176, 178.
Tappi Eng. Conf. Proce., San Francisco, CA, Kelly et. al., Sep. 19–21 1978, Publ by Tappi 1978, Book 2, pp. 467–481.
Plant Engineering, Gelosa et al., Jul. 12, 1979, vol. 33 No. 14,pp. 119–123.
Int'l Water Conf., Kelly et al., Oct. 30, 1979, Iron Oxide Deposition Complete System Control.
Power Eng., Palmer, Jan., 1980, pp. 50–51.
Material Performance, Jul. 7, 1996,vol. 35, Change et al., pp. 48–53.
Anti–Corrosion Methods and Materials, Turner, Feb. 2 1980, vol. 26N pp. 4–8.
Power, Jul. 1980, Sengupts, pp. 8384.
Power, Jan., 1982, vol. 126, Mucci, pp. 58–61.
W. Lehnick, J.M. McDowell, P.T. Thomas and T.H. Penny, "The Use of Dispersants For Removal of Sludge From a Nuclear Steam Generator", Paper No. 35, presented at IWC, 1982.
J.A. Kelly, "An Update on Controlling Iron Oxide Deposition In Boiler Systems", Corrosion/82, International Corroision Forum, Publ by Nace, Paper No. 117, Houston, Tx, Mar. 22–26, 1982, pp. 117.1–117.21.
Chem. Processing, Mar. 1982, vol. 45:3, Fleck, pp. 42–42.
J. Tech Biotechnol., 1988, Baumgratner et al., vol. 41, pp. 231–242.
Tappi J., 1993, vol. 75 No. 11 Johnston, pp. 205–208.
"The Generation and Behavior of Metal Oxide Colloids in PWR Steam Systems," ERRI Report NP–3718, written by Calgon Corporation, Oct., 1984.
Scott M. Boyette and Frederick A. Elliot, "HTP–2 A New Iron Dispersant For Medium To High Pressure Industrial Boilers," Off. Proc.–Int. Water Conf. 1992, vol. 53, pp. 263–70.
Power Gen. International '96, Taraschke et al., Dec. 4–6, 1996, pp. 1–8.

* cited by examiner

Primary Examiner—Bernard Lipman
(74) Attorney, Agent, or Firm—Emrich & Dithmar

(57) ABSTRACT

A novel high-purity polymer dispersant and sludge conditioner added to the feedwater entering the secondary side of a nuclear steam generator for minimizing the accumulation of metal-oxide deposits within the nuclear steam generator during the continuing operation of the generator is disclosed. The high-purity polymer is selected from a group consisting of acrylic acid polymer, methacrylic acid polymer, acrylate polymer, methacrylate polymer, copolymers, and terpolymers, acrylate/acrylamide copolymer, acrylate/methacrylate copolymer, terpolymers, and mixtures thereof. Methods of making and applying the polymer dispersant and sludge conditioner are described. Means for removing the metal oxides and polymer from the blowdown stream are disclosed.

22 Claims, 1 Drawing Sheet

POLYMER DISPERSANTS AND METHODS OF USE IN A NUCLEAR STEAM GENERATOR

This is a divisional of application Ser. No. 08/677,464 filed Jul. 10, 1996 U.S. Pat. No. 5,864,596.

BACKGROUND OF THE INVENTION

The present invention relates to novel methods and materials for minimizing metal-oxide deposits on steam generator tubes in the secondary side of pressurized nuclear steam generators by utilizing specific high-purity polymer dispersants.

At present, no method or process exists for eliminating and preventing the deposit of metal-oxides/sludge in the secondary side of nuclear steam generators during operation of the generator. The only method and process existing for controlling the amount of impurities that enter into the secondary side of the steam generator is the utilization of pure water. The consequences resulting from the buildup of metal oxides within the secondary side of a steam generator are reduced steam output thereby resulting in lost electrical output from the generating plant, increased water level fluctuations within the steam generator thereby resulting in lower steam and electrical output, and the initiation of corrosion deposits within the heat exchanger through the concentration of the dissolved chemical species from the secondary water. The corrosion within the secondary side of a pressurized nuclear steam generator ultimately may result in tube plugging and sleeving and the eventual loss of electrical output because of lost heat transfer or flow imbalances unless the steam generators themselves are replaced at a cost of approximately $200,000,000 per plant.

Accordingly, all known processes for eliminating deposits of metal oxides in the secondary side of recirculating steam generators have been directed to the removal of these deposits after they build-up in the heat exchanger. The major technique utilized for the removal of suspended and dissolved impurities from the secondary side of the recirculating steam generator involves removing a portion of the water from the steam generator during operation on a continuous or periodic basis through a blowdown system. Typically, the blowdown system only removes up to 10 percent of the total metal oxides or impurities which enter the recirculating nuclear system generator during operation, with the remaining metal oxides or impurities continuing to build-up and to be deposited within the secondary side of the recirculating nuclear steam generator. This deposition may result in pressure loss, level fluctuations, and corrosion of the secondary side of the nuclear steam generator.

Several mechanical and chemical methods have been suggested for removing metal oxides or impurities from within the secondary side of nuclear steam generators when the system is near or at shutdown conditions. One of these methods utilizes sludge lancing at shutdown which employs high pressure water to flush loosely adhered oxide deposits and sludge from the lower tube sheet of the nuclear steam generator. This process typically does not address deposition of corrosion in the upper tube support plates and does not clean any clogged crevices on the secondary side of the nuclear steam generator. The percentage of metal oxides or corrosion removed by this process is about two percent of the total oxides entering the nuclear steam generators over a typical 18-month fuel cycle. The cost of completing a sludge lancing is approximately $350,000 for each 18-month fuel cycle in a typical four-loop plant.

Another method suggested for removing metal oxides/sludge at shutdown from the secondary side of a nuclear steam generator is the bundle-flush process. This process entails directing flush water from the upper part of the recirculating nuclear steam generator to remove the loose sludge from the upper tube support plates. The cost of the bundle flush process is approximately $500,000 per application; however, the process only removes the soft, loosely adhered sludge, and does not remove sludge which is strongly adhered to the heat transfer surfaces. Additionally, the small crevices within the heat transfer structure are not cleaned at all by this process. Accordingly, this process is of limited value and does not overcome the problem of removing strongly adhered deposits or impediments within the heat-transfer structure.

Crevice flush techniques have been suggested in an attempt to open or clean closed or packed crevices by heating the secondary side of the nuclear steam generator above a boiling point with an inert atmosphere overpressure and then releasing this overpressure. The crevice flush process results in a boiling action which purportedly flushes the impurities from the crevices in the nuclear steamed generator. However, this method has only demonstrated limited effectiveness and is very time consuming, thereby prolonging downtime, an added cost in the electrical industry.

Chemical-soak techniques have been suggested for use during shutdown to promote removal of loose sludge and loosely adhered deposits within the nuclear steam generator. The chemical soaks employ amines such as dimethylamine and morpholine. These soaks have exhibited limited effectiveness in removing loosely adhered deposits, and the amount or percentage of metal oxides removed is less than acceptable. The advantage of this process is that the cost is low; but the disadvantages of this method are that the process is time consuming, and the effectiveness and the amount of metal oxides removed is less than satisfactory.

Pressure-pulse cleaning or water slapping are mechanical methods which are utilized during an outage or shutdown for removing loosely adhered sludge from the upper tubes or the tube support plates of the nuclear steam generator. The sludge or deposits are removed by raising the water on the secondary side to a desired level and then injecting a high pressure gas such as nitrogen into the water. The bursting of the bubbles as the gas approaches the surface of the water partially removes limited amounts of the loosely adhered sludge or oxide deposits. This technique may increase the amount of metal oxides removed from 5–15 percent of the total amount of metal oxides deposited within the nuclear steam generator; however, this method does not remove hard deposits and does not open crevices packed with metal oxides or other corrosion. The cost of a pressure pulse cleaning is typically $200,000 to $600,000 per unit. It is recommended that such a cleaning be employed every one-to-four refueling cycles.

Finally, the methods of chemical cleaning at low or high temperatures and the use of chemically enhanced pressure pulse cleaning are processes utilizing specific organic materials that dissolve the metal-oxide deposits within the nuclear steam generator. The cleaning solution dissolves the metal-oxide deposits, and the spent cleaning solution must be processed and properly disposed. The chemical-cleaning processes may be selected to remove specific metal oxides contained within the nuclear steam generator. Variations of the chemical cleaning process include the heating of the cleaning solution above the liquid-boiling temperature under an inert atmosphere and then releasing the pressure to force boiling in the cracks and the crevices and the use of pulse-cleaning techniques to promote circulation and movement of the cleaning solution. The chemical cleaning processes remove virtually one-hundred percent of the metal-oxide deposits within the secondary side of the recirculating steam generator, but at a cost of between $5,000,000–$10,000,000 per cleaning. Many of the nuclear generating plants in operation may require chemical cleaning at least once during their lifetime.

Thus, each of the mechanical prior art methods for removing metal-oxides from the secondary side of the nuclear steam generator is directed to removing the loosely deposited oxides within the heat-exchange structure that results from the continued operation of the nuclear power plant. Although chemical cleaning removes substantially all metal oxides, such a process is extremely expensive and time consuming. Accordingly, none of the known chemical or mechanical methods is directed to preventing the deposition or formation of sludge within the secondary side of a nuclear steam generator during operation of the generator. These processes attempt to remove the oxide and corrosive deposits after they have been deposited in the secondary side of the nuclear steam generator, processes which are extremely costly and which result in significant downtime of the nuclear power plant.

Natural polymer dispersants have been used to minimize deposition of sludge deposits in fossil steam generators since the early 1900's, and synthetic polymers have been recently utilized for metal-oxide dispersing and sludge conditioning in fossil steam generators. However, such synthetic polymers have not been qualified for use in minimizing metal-oxide deposition on the secondary side of recirculating nuclear steam generators. Most synthetic polymers developed and used today in water-treatment applications are manufactured using inorganics, such as sodium persulfate, as the initiators of polymerization, and other inorganics as chain transfer agents. However, the sodium and persulfate inorganics contribute unwanted contaminants in significant excess to those required for application in nuclear steam generator units. Polymers typically used in boilers contain inorganic solids at concentrations up to 500 times the allowable levels for application to nuclear steam generator units. Inorganic impurities can include sodium, potassium, chlorine, sulfur, fluorine, and phosphorus—elements which are particularly objectionable and damaging when used in nuclear steam generator operations.

Synthetic polymers used in water treatment applications are typically neutralized with sodium or potassium, forming the inorganic salt. Although ammonia-neutralized versions have been used to a small extent, ammonia is a known copper-alloy corrodent. Polymer neutralization minimizes system upset potential. Polymers have been used unneutralized, but the feed-rate variations have been known to cause system upsets by lowering the pH, thereby resulting in corrosion to the operating system.

SUMMARY OF THE INVENTION

It is one object of the present invention to provide a method and process of substantially preventing the formation of sludge, corrosion, or metal-oxide deposits within the secondary side of nuclear steam generators during all phases of operation.

It is another object of the present invention to provide a method of substantially preventing the formation of sludge, corrosion, or metal-oxide deposits within the secondary side of nuclear steam generators during all phases of operation by utilizing the application of a high-purity polymer dispersant to the feedwater entering the secondary side of nuclear steam generators.

It is still another object of the present invention to apply a high-purity polymer dispersant to the feedwater entering the secondary side of nuclear steam generators, wherein the high purity polymer dispersant is selected from a group consisting of acrylic acid polymer, methacrylic acid polymer, acrylate polymer, methacrylate polymer, copolymers, terpolymers, and mixtures thereof.

It is still another object of the present invention to select a high-purity polymer dispersant from a group consisting of acrylate/acrylamide copolymer, acrylate/methacrylate copolymer, terpolymers, and mixtures thereof.

It is still another object of the present invention to utilize qualified high-purity polymer dispersants added to the feedwater entering the secondary side of nuclear steam generators to prevent the formation of sludge, corrosion, or metal-oxide deposits within the secondary side of nuclear steam generators.

It is still another object of the present invention to utilize a chemically pure polymer dispersant combination to remove metal-oxide corrosion deposits within nuclear steam generators and to prevent the formation of such corrosion deposits during the operation of nuclear steam generators.

It is still another object of the present invention to prepare a high-purity polymer dispersant using non-inorganic initiators, terminators, and neutralizers for use in preventing the formation of sludge, corrosion, or metal-oxide deposits within the secondary side of nuclear steam generators.

It is still another object of the present invention to prepare a high-purity polymer dispersant having a high purity and molecular weight sufficient to render the polymer dispersant thermally stable with sufficient dispersant activity under a pressure of 1300 psi or less and a temperature corresponding to the saturation temperature at 1300 psi.

It is still another object of the present invention to minimize system upsets in nuclear steam generators by neutralizing the high-purity polymer dispersant with amines, such as, monoethanolamine, morpholine, dimethylamine, 3-methoxypropylamine, diethanolamine, diethylaminoethanol, diemrthylpropanolamine, cyclohexylamine, 2-amino-2-methyl-1-propanol, triethanolamine, 3-hydroxyquinuclidine and 5-aminopentanol to maintain a pH level of about 9.5 in the steam generators.

It is still another object of the present invention to utilize a high-purity polymer dispersant mixed with the feedwater entering the secondary side of a pressurized water reactor steam generators operating in a pressure range of 500 to 1300 psi to prevent the formation of metal-oxide corrosion deposits during the operation of the nuclear power plant.

It is still another object of the present invention to utilize high-purity polymer dispersants which may contain sulfur-containing active groups or phosphorus-containing active groups which can be qualified to meet the necessary water quality specifications and which may be used to provide removal of metal oxides from the nuclear steam generator during shutdown.

It is still another object of the present invention to utilize methods such as filtration with specialized filter media by varying the effective pore sizes and zeta potential to remove residual polymer dispersant and complexed metal-oxide/polymer dispersant from the discharge blowdown water for recycling.

It is still another object of the present invention to utilize charcoal or activated carbon filters to remove residual polymer dispersant and complexed metal-oxide/polymer dispersant from the discharged blowdown water for recycling through the system or ultimate discharge to a receiving stream.

It is still another object of the present invention to utilize methods such as demineralization to remove the residual-polymer dispersant and complexed metal-oxide/polymer dispersant from the discharged blowdown water for use as recycled feedwater for steam generation within the nuclear plant or ultimate discharge to a receiving stream.

It is still another object of the present invention to utilize purification and ultrafiltration methods, such as flocculation, coagulation, reverse osmosis, and ultrafiltration to remove the residual polymer dispersant and complexed metal-oxide/polymer dispersant from the discharged blowdown water prior to recycling or ultimate discharge to a receiving stream.

The present invention relates to the utilization of selected high-purity polymer dispersants for preventing the formation of deposits of metal oxides within the secondary side of a nuclear steam generator in all modes of operation. The polymer dispersant is selected from a group consisting of acrylic acid polymer, methacrylic acid polymer, acrylate polymer, methacrylate polymer, copolymers, terpolymers, and mixtures thereof, acrylate/acrylamide copolymer, acrylate/methacrylate copolymer, terpolymers, and mixtures thereof. Specifically, the polymer dispersant may be the polymer monounsaturated carboxylic acid or the polymer sulfonated styrene polymer, and copolymers. Also, it is within the scope of the present invention that polymer dispersants or polymer-dispersant blends having sulfur-containing and phosphorus-containing functional groups or mixtures thereof may be utilized for iron transport and removal from the nuclear steam generator during shutdown or operation of the nuclear power reactor.

The polymer dispersant used in the present invention is of sufficient purity wherein the resultant chemical analysis of the discharge from the secondary side of the nuclear steam generator through the blowdown system yields a concentration of sodium, potassium, calcium, magnesium, chloride, sulfate, silicate, and phosphate ions of less than about 10 parts per billion of each ion in the blowdown during normal operation.

Additionally, the polymer dispersants utilized in the present invention as an additive to the feedwater entering the secondary side of a nuclear power generator possess metal-oxide dispersive and sludge conditioning characteristic of approximately 1 to 1,000 parts polymer dispersant to remove and prevent the buildup of one part iron oxide, the predominant metal oxide contained in the metal-oxide/sludge discharge from the nuclear steam generator. However, the polymer-dispersant concentration depends upon the amount of iron oxide in the feedwater stream and the concentration of the polymer initially used as the additive and is, preferably, within the range of 1 to 25 parts polymer versus one part iron oxide. The measured cation conductivity of the steam exiting the secondary side of the nuclear power generator and entering the turbine, corrected to 25° C., should be equal to or less than $1.0\ \mu S/cm$. Finally, the metal-oxide transport, or degree of the removal of iron oxide from the feedwater entering the secondary side of the nuclear power generator, as contained in the blowdown stream, is equal to or greater than a five percent increase than when the system does not contain the disclosed polymer dispersant or dispersants.

The invention further consists of certain novel features and chemical details hereinafter fully described, and illustrated in the accompanying drawing and particularly pointed out in the appended claims, it being understood that various changes and details may be made without departing from the spirit, or sacrificing any of the advantages of the present invention.

DESCRIPTION OF THE DRAWING

For the purpose of facilitating and understanding the present invention, it is illustrated in the accompanying drawing the preferred embodiment of the present invention hereof, from an inspection of which, when considered in connection with the following description, the invention, its operation, and many of its advantages, will be readily understood and appreciated.

DETAILED DESCRIPTION

Figure 1:
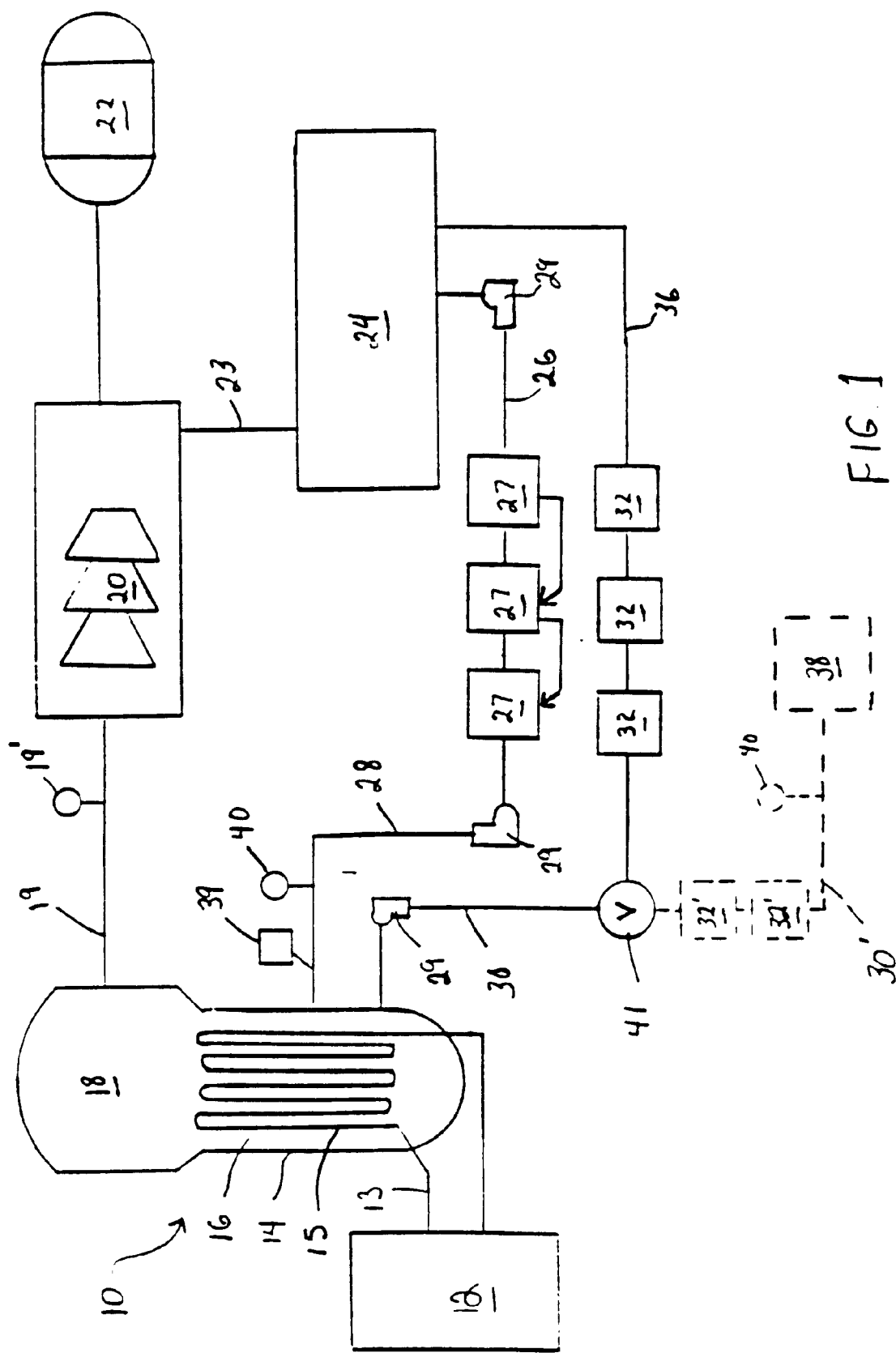
FIG. 1 is a schematic diagram illustrating the components of a nuclear power plant and the application of the novel polymer dispersant to the feedwater entering the secondary side of the nuclear power plant to remove and to prevent the formation of sludge, corrosion, or metal oxides therein in accordance with the present invention.

FIG. 1 schematically illustrates a nuclear power station 10 which is comprised of a reactor 12 operatively connected to a steam generator 14 wherein the heat from the reactor is directed through a conduit 13 into heat exchanger tubes 15 within the steam generator 14. The reactor heats the feedwater entering the secondary side 16 of the steam generator in the steam-drum portion 18 of the steam generator to produce the saturated steam leaving the secondary side through conduit 19 to drive a turbine 20 and generator 22, as is known in the art. The spent-heated steam exiting the turbine 20 is directed through a conduit 23 to a condenser 24 under vacuum, wherein the circulating steam/feedwater is cooled. The cooled feedwater exits the condenser 24 via conduit 26 and passes through a series of extractors and low and high pressure heaters 27 for heating the recycled feedwater and returns via conduit 28 to the secondary side of the nuclear steam generator, as is known in the art. Appropriately, pumps 29 are provided to facilitate cycling of the system. A blowdown conduit 30 exits the lower secondary side of the nuclear steam generator 14 for facilitating and for permitting removal of impurities that build up within the nuclear steam generator. The blowdown material exiting the secondary side of the nuclear steam generator is filtered by a series of filtering means 32, which may include charcoal, activated carbon, mesh filter, ultrafiltration, or reverse osmosis, chemically analyzed through sampling ports 40, and then returned to the condenser 24 under vacuum through conduit 36 for further purification and then returned as feedwater entering the secondary side of the nuclear reactor in the same manner as has been discussed with the steam/feedwater. In the alternative, the blowdown material may be directed via valve 41 through conduit 30' to various filter means 32' for filtering the treated waste material to permit the material to be discharged into a receiving stream 38.

The blowdown method of removing the oxides and impurities within the secondary side of the steam generator in accordance with the prior art techniques only removes up to 10 percent of the total metal oxides that build up within the secondary side of the nuclear steam generator 14. Importantly, the present invention utilizes the identification of selected high purity polymer dispersants which, when added to the feedwater entering the secondary side of the nuclear steam generator, prevent the accumulation of metal oxides within the secondary side of the nuclear steam generator during operation of the generator and substantially increase the metal oxides removed from the nuclear steam generator.

The novel polymer dispersants and sludge conditioners utilized in the present invention are selected from a group consisting of acrylic acid polymer, methacrylic acid polymer, acrylate polymer, methacrylate polymer, copolymers, terpolymers, thereof. Also, the polymer dispersant may be selected from a group consisting of acrylate/acrylamide copolymer, acrylate/methacrylate copolymer, and terpolymers and mixtures thereof. Specifically, the polymer dispersant may be monounsaturated carboxylic acid or the polymer or copolymers of sulfonated styrene. It is within the scope of the present invention that polymer disperants or polymer dispersant blends having sulfur-containing and phosphorus-containing functional groups or mixtures thereof may be utilized in the present invention for iron transport and removal from the nuclear steam generator 14 during shutdown or operation of the nuclear power reactor.

The polymer dispersants used in the present invention possess a high purity wherein the resultant chemical analysis of the filtered and cleaned blowdown discharge from the secondary side of the nuclear steam generator yields a concentration of sodium, potassium, calcium, magnesium, chloride, sulfate, silicate, and phosphate ions of less than about 10 parts per billion of each ion during normal operation. Preferably, the chemical analysis of each of the ion concentrations in the blowdown discharge should be in the range of about one part per billion or less.

During normal operation, the iron concentration in feedwater is typically less than five parts per billion. However, during non-steady state operation, for example during a unit startup, the feedwater iron concentration may be elevated to several hundred parts per billion. The polymer dispersants in accordance with the present invention minimize metal oxide fouling and deposition and provide sludge conditioning in nuclear steam generators. Sludge conditioning allows for enhanced removal of metal oxides during sludge lancing of steam generators. These high-purity polymers minimize the amount of inorganic contaminants to the feedwater of nuclear steam generating units and in the blowdown after concentration in the secondary side of the units. The polymer product inorganic contaminant level must not exceed 100 parts per million total inorganic solids when the steam generator water is cycled 100 times and must not exceed 30 parts per million when cycled 300 times. These requirements are based on the necessity that the product contaminant level not exceed 10 parts per billion in the blowdown and, preferably, less than one part per billion. In combination with all of the above restrictions, the resulting polymer must be thermally stable at system-operating pressures and temperatures and low-operating pH (9.5) and capable of dispersing metal oxides, such as iron oxide. An especially preferred embodiment of the present invention is the polymeric composition produced when hydrogen peroxide or other organic peroxides are used as initiators for the polymerization of acrylic acid, methacrylic acid, and other known useful monomers for the present invention. Additional initiators which produce no inorganic contaminants include benzoyl peroxide (tradename LUCIDOL 78 available from Elf Atochem), acetyl peroxide, succinic acid peroxide, lauroyl peroxide (tradename Alperox-F available from Elf Atochem), decanoyl peroxide (tradename Decanox-F available from Elf Atochem), hydrogen peroxide, 2,2' azobis (2-methylpropanenitrile) (tradename Vazo 64 available from DuPont), 2,2' azobis (2-methylbutanenitrile) (tradename Vazo 67 available from DuPont), t-Butyl peroctoate, t-Butyl peroxyiso butgrate (tradename Lupersol 80 available from Elf Atochem), t-butyl peroxyprivalate (tradename Lupersol 11 available from Elf Atochem), and 4,4'-azobis (4-cyonovaleric acid) (tradename V-501 available from Wako). Hydrogen peroxide and other organic peroxides and organic initiators do not contribute inorganic contaminants but unexpectedly produce an effective polymeric dispersant and sludge conditioner for metal oxides which is substantially free of inorganic solids.

The concentration of polymer dispersant utilized in the present invention as an additive to the feedwater entering the secondary side of the nuclear steam generator possesses a metal oxide dispersive characteristic of approximately 1 to 1,000 parts polymer dispersant to remove and to prevent the buildup of one part iron oxide within the generator. However, the preferred range is between about 1 to 25 parts dispersant. Iron oxide is the predominant metal oxide contained in the discharge from the nuclear steam generator. Accordingly, the concentration levels of the polymer dispersant depends upon the amount of iron oxide present in the feedwater and the concentration of the polymer dispersant initially used as the polymer-dispersant additive.

As pointed out above, it is also within the scope of the present invention that the novel polymer dispersants useful in the present invention may contain functional groups containing sulfur and/or phosphorus which, although they break down during the passage through the nuclear steam generator and compromise secondary-water quality and increase corrosion potential, such active groups within the polymer dispersant may be used where the breakdown does not increase the concentration of Na, K, Ca, Mg, Cl, $SO_4$, Si, and $PO_4$ ions greater than about 10 parts per billion.

The measured cation conductivity through sampling port 19' of the steam exiting the secondary side of the nuclear power generator 14 through conduit 19 should be equal to or less than 1.0 $\mu$S/cm when converted to 25° C. The metal-oxide transport or the removal of the metal oxide from the feedwater entering the secondary side of the nuclear power generator contained in the blowdown system is equal to or greater than a five percent increase when the system does not contain the disclosed polymer dispersants.

One example of a high-purity polymer dispersant useful in the present invention is a polyacrylic-acid polymer dispersant designated as Polymer A, and was prepared as follows:

Into a glass-lined reactor was placed 64.38 parts demineralized water, 20.60 parts glacial acrylic acid, and 10.94 parts isopropanol, as the chain-transfer agent, with stirring. A nitrogen sparge was begun and bubbled through the stirred solution for 15 minutes. The temperature was raised to 88° C., and 4.08 parts hydrogen peroxide (35 percent) was added. Under nitrogen blanket, the temperature was maintained at 88° C. for 5½ hours. Cooling may be used if the temperature exceeds 92° C. At the end of the reaction, the isopropanol was stripped off the reaction product and the measured temperature was 96° C. Cooling was begun and a proportional amount of demineralized water was added to compensate for the removal of the isopropanol-water mixture. The final product designated as Polymer A was free of inorganic solids, contained only 100 parts per million isopropanol, possessed 20 percent solids and had a measured pH of 2. The weight average molecular weight of Polymer A was 135,000. Analysis of Polymer A showed it to contain chloride <2 ppm, sodium <10 ppm, sulfur <5 ppm, phosphorus <5 ppm, and potassium <10 ppm. Polymer A demonstrated excellent thermal stability after exposure for two hours at 900 psig and 277° C., using hydrazine as the oxygen scavenger.

Another example is the preparation of a high-purity polyacrylic acid without the use of isopropanol as the chain-transfer agent. Into a glass-lined reactor was placed 34.34 parts demineralized water and 16.09 parts glacial acrylic acid with stirring. A nitrogen sparge was begun and bubbled through the stirred solution for 15 minutes. The temperature was raised to 80° C., and 27.89 parts hydrogen peroxide (35 percent) was slowly added. The temperature climbed to 88° C. Cooling was applied so the temperature would not exceed 91° C. Under nitrogen blanket, the temperature was raised to 95° C. and held at this temperature for 5¼ hours. The product was then cooled to room temperature, and 21.68 parts monoethanolamine was slowly added with cooling. The monoethanolamine salt of polyacrylic acid, designated as Polymer B, was free of inorganic solids and contained 20.5 percent solids. The product had a measured pH of 10.2 and a weight-average molecular weight of 138,000. Thus, it is within the scope of the present invention that the polymer dispersant and sludge conditioner may have a weight-average molecular weight of about 1,000,000 or less, with the preferred weight-average molecular weight being between about 70,000 to 150,000.

To measure the effectiveness of high-purity polymers for dispersing iron oxide, the precipitated iron (5 ppm Fe) in the test was prepared in situ as iron hydroxide at pH 11. A dosage of 6 ppm active polymer was added, and the resulting mixture was refluxed for three hours prior to a settling test. A good iron dispersant will maintain most of the iron suspended in solution after a 23-hour settling period. Results of the tests are given in Table 1 below:

TABLE 1

| Treatment | Brookfield Viscosity of Treatment, cps | Iron Dispersion ppm | % Dispersion |
|---|---|---|---|
| Polyacrylates | | | |
| Polymer A | 275 | 4.25 | 85 |
| Polymer B | 613 | 2.76 | 55 |
| Polymer C | 515 | 4.37 | 87 |
| Polymer D | 1,215 | 4.34 | 87 |
| Polymer D | 1,312 | 4.37 | 87 |
| Polymer E | 3,340 | 4.44 | 89 |
| Polymer F | 8,820 | 4.29 | 86 |
| Polymer G | 63,500 | 3.71 | 74 |
| Polymethacrylates | | | |
| Polymer I | 910 | 3.37 | 67 |
| Polymer J | 2,400 | 4.65 | 93 |
| Acrylate/Methacrylate Copolymer | | | |
| Polymer K (80/20)* | 348 | 4.26 | 85 |
| Polymer L (70/30)* | 260 | 4.72 | 94 |
| Polymer M (60/40)* | 1,135 | 4.64 | 93 |
| Acrylate/Methacrylate/t Butyl Acrylamide Terpolymer | | | |
| Polymer N (65/30/5)* | 270 | 4.08 | 81 |
| Polymer O (60/30/10)* | 265 | 4.51 | 90 |
| Acrylate/Methacrylate/ Maleic Acid Terpolymer | | | |
| Polymer P (65/30/5)* | 393 | 4.55 | 91 |
| Polymer Q (60/30/10)* | 237 | 4.25 | 85 |
| Polymer R | 750 | 0.46 | 9 |

*(By mole)

As shown in the above table, the high-purity polymers (Polymers A–Q) are highly effective dispersants for iron oxide, whereas Polymer R was relatively ineffective. The Polymer A–Q contain 19–21 percent solids. Polymer R was a commercial 45 percent solution of polyacrylic acid made using sodium persulfate as the initiator containing 2.9 percent sodium. The metal oxide removal percent is calculated as follows:

$$MOR\ \% = \frac{\text{(Metal oxide conc. in blowdown)}(\text{Mass flow rate of blowdown})}{\text{(Metal oxide conc. in feedwater)}(\text{Mass flow rate of feedwater})} \cdot 100\%$$

Thus, in typical nuclear steam generators, the MOR percent is about five percent without the polymer-dispersant treatment. Table 1 demonstrates the effectiveness in dispersing iron oxides through the system. For example, Polymer A dispersed 85 percent, a 1700 percent increase.

Polymer A has been chemically analyzed and calculated to contribute sodium, potassium, calcium, magnesium, chloride, sulfate, silicate, and phosphate ion concentrations in the blowdown discharge of less than about 10 parts per billion, and, preferably, less than one part per billion.

Another factor to consider in selecting the appropriate polymer dispersant is the breakdown rate or thermal stability of the polymer dispersant under nuclear steam generator conditions versus the residence time of any species entering the nuclear steam generator. The residence time is calculated as follows: Residence Time=$7 \cdot t_{1/2}$ where $t_{1/2}$ is the half-life of the cleanup system.

$$t_{1/2} = ln(2) \cdot M_{SG}/m_{BD}$$

where $M_{SG}$=The Mass of liquid in steam generator, (lbs.) and $m_{BD}$=The Mass flow rate of blowdown, (lbs./hr.) For a typical nuclear steam generator:

$M_{SG}$=100,000 lbs. of liquid at full power $m_{BD}$=33,000 lbs./hr.

which yields a half-life $t_{1/2}$ of 2.1 hours and a residence time of 14.7 hours. A residence time of 14.7 hours means that the quantity of polymer dispersant entering the generator is not measurably detectable after 14.7 hours. The breakdown rate of the polymer is based on refreshed autoclave testing which determined polymer concentrations as a function of time. The polymer dispersant possessed the desired thermal stability for use in the nuclear steam generator.

The thermal stability of high-purity polymers was determined by measuring the activity of the polymers for dispersing iron oxide before and after autoclaving for four hours at 900 psig and 530° F. The test solution was adjusted to a pH of about 9.5 using diethanolamine. Results of the tests obtained at a polymer dosage of 10 ppm active are given in Table 2:

TABLE 2

| | Iron Dispersion, ppm | |
|---|---|---|
| Treatment | Before Autoclaving | After Autoclaving |
| Polymer C | 4.35 | 4.69 |
| Polymer D | 4.38 | 4.66 |
| Polymer E | 4.32 | 4.63 |
| Polymer F | 4.44 | 4.50 |
| Polymer H | 4.33 | 4.67 |

The performance of the high-purity polymers (Polymers C, D, E, F, and H) is not adversely affected by autoclaving under high pressure and high-temperature conditions.

The high-purity polymers are preferably neutralized with an amine for addition to the secondary side of a nuclear steam generator for dispersing metal oxides. Suitable neutralizing amines are monoethanolamine, morpholine, dimethylamine, 3-methoxypropylamine, diethanolamine, diethylaminoethanol, dimethylpropanolamine, cyclohexylamine, 2-amino-2-methyl-1-propanol, triethanolamine, 3-hydroxyquinuclidine, and 5-aminopentanol. Examples of the amine salt of high purity polymers are monoethanolamine salt of Polymer A, morpholine salt of Polymer A, and 3-methoxypropylamine salt of Polymer A. Neutralizing amines not only possess neutralizing ability, but also have metal-passivation effects.

Finally, if a polymer dispersant is acceptable based upon purity, cation conductivity, metal-oxide transport, and residence time, the selected polymer dispersant should be evaluated in a Constant Extension Rate Test (CERT). This test involves the measurement of the stress-corrosion cracking of a specimen comprised of Alloy 600, the principle tubing utilized within a steam generator of a nuclear power plant. The CERT test requires Alloy 600 tubing having a gage length of 0.5 inch, a width of 0.125 inches, and a wall thickness of approximately 0.045 inches. Test solutions were prepared in a stainless-steel feed tank, and the feed tanks were purged of oxygen and filled with nitrogen prior to the preparation of the test solution. A nitrogen-cover gas was maintained on the test solution at all times, and the tests were performed on two test solutions. The standard test solution #1 contained high-purity water plus 100 parts per million 3-methoxypropylamine plus 10 parts per million of $N_2H_4$ (hydrazine), and test solution #2 further included 312 parts per million of the polymer dispersant, a concentration approximately 100 times greater than the recommended concentration to be used during reactor operations to demonstrate that metal degradation does not occur during normal operating conditions.

The tests were performed in a refreshed CERT autoclave with the test solutions being prepared in stainless-steel tanks. The CERT tests were performed at a temperature of approximately 610° F. and at a pressure of approximately 1,900 psi, which is in excess of the saturation pressure at the test temperature. The test solutions were determined to have an ion concentration of 25 parts per billion or less. The CERT test required a clean Alloy 600-test specimen to be placed in the rig, and the autoclave sealed. Each solution separately was pumped through the autoclave at approximately 0.1 gallon per hour which flow rate provided an autoclave-residence time of two to four hours for each of the test solutions. The autoclave was heated to approximately 610° F. during the test, and the tube specimen was pulled at a constant cross-head displacement rate of approximately $5 \times 10^{-7}$ inches per second, a strain rate of approximately $1 \times 10^{-6}$. During each test the parameters, such as autoclave temperatures, autoclave pressure, specimen displacement, specimen load, and lab test time were recorded.

After the legs of the test specimen failed, the autoclave was cooled to room temperature and the specimen removed. The failed specimens were ultrasonically cleaned and examined with a scanning-electron microscope. The fracture face of the legs were examined to determine the degree of intergranular-stress-corrosion cracking which occurred during the test. Results of the stress-corrosion-cracking test indicated that the test solutions did not visually appear to increase the stress-corrosion-cracking of Alloy 600, during a test time of approximately 150 hours per test. This test evaluation indicated that the tested polymer dispersant did not affect the failure rate of Alloy 600 tubes.

In a typical 1100 megawatt nuclear steam plant, about 30,000 gallons per minute of feedwater is circulated through the steam generators, which amounts to approximately 15,000,000 pounds of feedwater per hour through the generators. The secondary side of a nuclear steam generator is operated in a range of about 500 to 1300 psi, with the preferred range being between about 900 to 1300 psi. To maintain an effective concentration of the polymer dispersant in the feedwater, approximately 500 pounds of the concentrated polymer dispersant would be added to the feedwater per month. This addition may be made either by injecting a slug amount of polymer dispersant rapidly into the feedwater or by the constant addition to the feedwater through port 39, while maintaining a concentration of the specified ions of less than 10 parts per billion, and preferably less than one part per billion ion concentration in the blowdown stream. The blowdown stream exits the secondary side 16 of the nuclear steam generator 14 through conduit 30 wherein the blowdown material containing the removed and transported metal oxide is directed through a series of filter means 32, wherein the residual-polymer dispersant and complex metal-oxide/polymer dispersant from the discharge-blowdown water is purified for recycling to the condenser 24.

In accordance with the present invention, the specialized filter means may include charcoal or activated-carbon filters, filter members having predetermined pore size and zeta potential, and demineralization techniques to remove residual polymer and complexed metal oxides for recycling the blowdown water within the nuclear plant. The present invention further contemplates the removal of the residual-polymer dispersant and complexed metal-oxide/polymer dispersant from the blowdown waste utilizing the method of flocculation and coagulation and reverse osmosis for either recycling or ultimate discharge to a receiving stream 38. These methods of filtration and purification respectively remove the residual-polymer dispersant and complexed metal-oxides/polymer dispersant from the discharge-blowdown water for recycling through the condenser to the feedwater conduit.

The novel method of preventing the formation of sludge, corrosion, or metal-oxide deposits within the secondary side of nuclear steam generators during the continued operation of the generator utilizes the injection of the high-purity polymer dispersant and/or sludge conditioners into the feedwater. The polymer dispersant possesses a chemical purity of less than 10 parts per billion of ions selected from a group comprising sodium, potassium, chloride, sulfate, phosphate, magnesium, calcium, and silicate as measured in the blowdown stream. The chemical purity of the feedwater and polymer dispersant and the cation conductivity may be determined through sampling ports 40 and 19', respectively. Variations of the novel method further includes the step of discharging the blowdown water from the secondary side of the nuclear steam generator and then filtering and removing the residual-polymer dispersant and complexed metal oxide from the blowdown stream for recycling as feedwater entering the secondary side of the nuclear steam generator. The above-identified process may include also the utilization of specialized filter means having predetermined pore size and zeta potential and filter purification means such as charcoal, activated carbon, flocculation, coagulation, reverse osmosis, and ultrafiltration to remove the polymer dispersant and complex metal oxide prior to ultimate discharge to a receiving stream.

While several embodiments of the invention have been described in the present specification, it is clearly understood that the embodiments are susceptible to numerous changes apparent to one skilled in the art, and, therefore, we do not wish to be limited to the details shown or described but intend to show all changes and modifications which come within the scope and parameters of the appended claims.

We claim:

1. A high-purity polymer dispersant and sludge conditioner for addition to the feedwater entering the secondary side of a nuclear steam generator during the continuing operation of the generator for minimizing the accumulation of metal-oxide deposits within the secondary side of the nuclear steam generator, wherein said high-purity polymer dispersant and sludge conditioner is selected from a group consisting of acrylic acid polymer, methacrylic acid polymer, acrylate polymer, methacrylate polymer, copolymers, acrylate/acrylamide copolymer, acrylate/methacrylate copolymer, and mixtures thereof and wherein said high-purity polymer dispersant and sludge conditioner has a contribution of ions of about 10 parts per billion or less each of sodium, potassium, calcium, magnesium, chloride, sulfate, silicate, and phosphate.

2. The polymer dispersant and sludge conditioner in accordance with claim 1, wherein said contribution of each ion to said blowdown is about one part per billion or less.

3. The polymer dispersant and sludge conditioner in accordance with claim 1, wherein said polymer dispersant and sludge conditioner possesses a metal oxide to polymer ratio of about 1 to 1,000 parts polymer to treat one part metal oxide.

4. The polymer dispersant and sludge conditioner in accordance with claim 1, wherein the preferred range of the metal oxide to polymer ratio is about 1 to 25 parts polymer to treat one part metal oxide.

5. The polymer dispersant and sludge conditioner in accordance with claim 1, wherein said group further includes sulfur-containing and phosphorus-containing functional groups and mixtures thereof.

6. The polymer dispersant and sludge conditioner in accordance with claim 5, wherein said sulfur-containing functional group is selected from a group consisting of sulfonated styrene polymers, copolymers, terpolymers, and mixtures thereof.

7. The polymer dispersant and sludge conditioner in accordance with claim 1, wherein said polymer dispersant and sludge conditioner has a weight-average molecular weight of about 1,000,000 or less.

8. The polymer dispersant and sludge conditioner in accordance with claim 1, wherein said polymer dispersant and sludge conditioner has a weight-average molecular weight of between about 70,000 to 150,000.

9. The polymer dispersant and sludge conditioner in accordance with claim 1, wherein said high-purity polymer dispersant and sludge conditioner is substantially free of inorganic solids.

10. The polymer dispersant and sludge conditioner according to claim 1, wherein the initiator and chain terminator of the polymer provides a polymer which is substantially free of inorganic solids, said initiator being selected from a group consisting of benzoyl peroxide, acetyl peroxide, succinic acid peroxide, lauroyl peroxide, decanoyl peroxide, hydrogen peroxide, 2,2' azobis (2-methylpropanenitrile), 2,2' azobis (2-methylbutanenitrile), t-butyl peroctoate, t-butyl peroxy-iso butgrate, t-butyl peroxyprivalate, and 4,4'-azobis (4-cyonovaleric acid), and mixtures thereof.

11. The polymer dispersant and sludge conditioner in accordance with claim 1, wherein the polymer is neutralized with an amine.

12. The polymer dispersant in accordance with claim 11, wherein said amine is selected from a group consisting of monoethanolamine, morpholine, diethylaminoethanol, dimethylamine, diethanolamine, 3-methoxypropylamine, dimethylpropanolamine, cyclohexylamine, 2-amino-2-methyl-1-propanol, triethanolamine, quinuclidine, 5-aminopentanol, and mixtures thereof.

13. A high-purity polymer dispersant and sludge conditioner for addition to the feedwater entering the secondary side of a nuclear steam generator during the continuing operation of the generator for removal of existing metal-oxide deposits from the secondary side of the nuclear steam generator, wherein said high-purity polymer dispersant and sludge conditioner is selected from a group consisting of acrylic acid polymer, methacrylic acid polymer, acrylate polymer, methacrylate polymer, copolymers, acrylate/acrylamide copolymer, acrylate/methacrylate copolymer, and mixtures thereof and wherein said high-purity polymer dispersant and sludge conditioner has a contribution of each ion of about 10 parts per billion or less of sodium, potassium, calcium, magnesium chloride, sulfate, silicate, and phosphate.

14. The polymer dispersant and sludge conditioner in accordance with claim 13, wherein said contribution of each ion to said blowdown is about one part per billion or less.

15. The polymer dispersant and sludge conditioner in accordance with claim 13, wherein said polymer dispersant and sludge conditioner possesses a metal oxide to polymer ratio of about 1 to 1,000 parts polymer to remove one part metal oxide from the secondary side of the nuclear steam generator.

16. The polymer dispersant and sludge conditioner in accordance with claim 13, wherein the preferred range of the metal oxide to polymer ratio is about 1 to 25 parts polymer to remove one part metal oxide.

17. The polymer dispersant and sludge conditioner in accordance with claim 13, wherein said polymer dispersant and sludge conditioner has a weight-average molecular weight of about 1,000,000 or less.

18. The polymer dispersant and sludge conditioner in accordance with claim 13, wherein said polymer dispersant and sludge conditioner has a weight-average molecular weight of between about 70,000 to 150,000.

19. The polymer dispersant and sludge conditioner in accordance with claim 13, wherein said high-purity polymer dispersant and sludge conditioner is substantially free of inorganic solids.

20. The polymer dispersant and sludge conditioner according to claim 13, wherein the initiator and chain terminator of the polymer provides a polymer which is substantially free of inorganic solids, said initiator being selected from a group consisting of benzoyl peroxide, acetyl peroxide, succinic acid peroxide, lauroyl peroxide, decanoyl peroxide, hydrogen peroxide, 2,2' azobis (2-methylpropanenitrile), 2,2' azobis (2-methylbutanenitrile), t-butyl peroctoate, t-butyl peroxy-iso butgrate, t-butyl peroxyprivalate, and 4,4'-azobis (4-cyonovaleric acid), and mixtures thereof.

21. The polymer dispersant and sludge conditioner in accordance with claim 13, wherein the polymer is neutralized with an amine.

22. The polymer dispersant and sludge conditioner in accordance with claim 21, wherein said amine is selected from a group consisting of monoethanolamine, morpholine, diethylaminoethanol, dimethylamine, diethanolamine, 3-methoxypropylamine, dimethylpropanolamine, cyclohexylamine, 2-amino-2-methyl-1-propanol, triethanolamine, quinuclidine, 5-aminopentanol, and mixtures thereof.

* * * * *

UNITED STATES PATENT AND TRADEMARK OFFICE
CERTIFICATE OF CORRECTION

PATENT NO. : 6,228,950 B1
DATED : May 8, 2001
INVENTOR(S) : Phillip M. Egebrecht, Joseph D. Bates, John A. Kelly, James D. Haff and Ralph Minnis.

It is certified that error appears in the above-identified patent and that said Letters Patent is hereby corrected as shown below:

Title page,
Item [12] delete the name "Egerbrecht et al." and insert -- Egebrecht et al. --;
Item [75] delete the name "Phillip M. Egerbrecht" and insert -- Phillip M. Egebrecht --.

Column 2,
Line 22, delete the word "steamed" and insert -- steam --;
Line 35, after the word "but", insert -- , --;
Line 37, delete the word "is" and insert -- are --;

Column 3,
Line 18, delete the word "is" and insert -- are --;

Column 4,
Line 49, after the word "of", delete the word "a";

Column 5,
Line 49, delete the word "characteristic" and insert -- characteristics --;

Column 10,
Line 2, delete the word "Polymer" and insert -- Polymers --.

Signed and Sealed this

Twenty-seventh Day of November, 2001

Attest:

*Nicholas P. Godici*

*Attesting Officer*

NICHOLAS P. GODICI
*Acting Director of the United States Patent and Trademark Office*